United States Patent

[11] 3,592,553

| [72] | Inventor | Charles K. Heizer<br>c/o United Engineering Company P.O. Box 165, Imperial, Mo. 63052 |
|---|---|---|
| [21] | Appl. No. | 774,675 |
| [22] | Filed | Nov. 12, 1968 |
| [45] | Patented | July 13, 1971 |

[54] BORING TOOL ASSEMBLY
6 Claims, 9 Drawing Figs.

[52] U.S. Cl. ..................... 408/124, 408/158
[51] Int. Cl. ..................... B23b 29/03
[50] Field of Search ............... 77/1, 4, 58, 58.3, 58.31, 58.32

[56] References Cited
UNITED STATES PATENTS

| 1,233,994 | 7/1917 | Dow | 77/58 |
| 1,878,175 | 9/1932 | Oyen | 77/58 |
| 2,745,668 | 5/1956 | Haas | 77/58 |
| 3,011,368 | 12/1961 | Hayes | 77/58 |
| 3,146,648 | 9/1964 | Ortet et al. | 77/58 |
| 3,422,705 | 1/1969 | Nahodil et al. | 77/58 |
| 2,804,786 | 9/1957 | Stenger | 77/58 |
| 3,228,265 | 1/1966 | Stoddard et al. | 77/58 |

Primary Examiner—Gerald A. Dost
Attorney—John D. Pope, III

ABSTRACT: A boring tool assembly is comprised of a vertically disposed spindle rotatably mounted within a spindle housing about a vertical axis, spindle drive means adapted to rotate the spindle, a horizontal guide track rigidly secured to the bottom of the spindle, a block member movably received in the guide track, a cutting tool operatively secured to the block member, and a movable block adjustment means within the spindle engaging the block member for moving it along the guide track. The block adjustment means includes a shaft member movably mounted within the spindle and bearing against a bearing portion of the block member. The shaft member is movable between a first position and a second position by a drive means so that movement of the shaft member forces the block member to move horizontally along the guide track.

3,592,553

PATENTED JUL 13 1971

INVENTOR
CHARLES K. HEIZER
BY John D. Pope
ATTORNEY

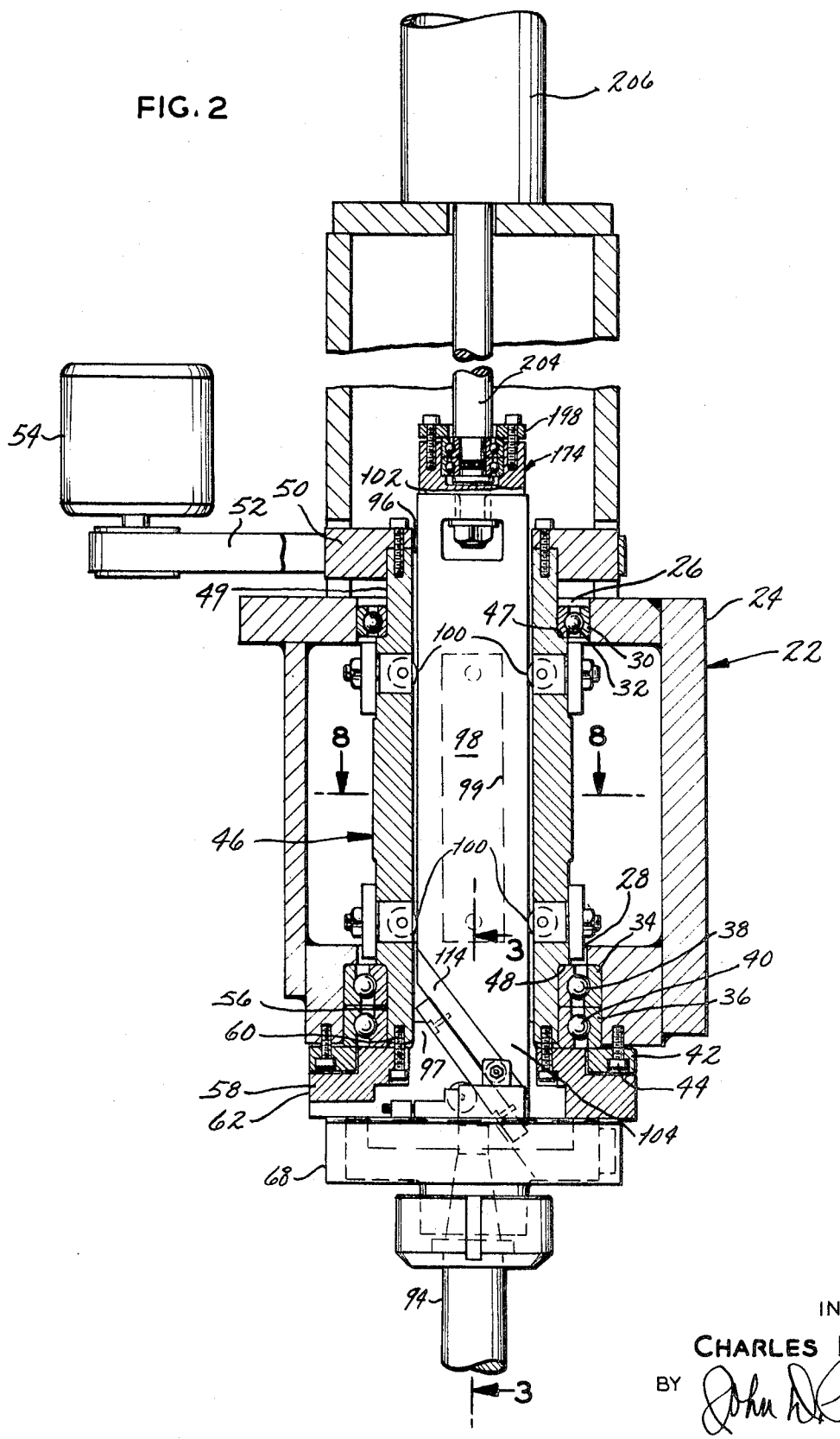

INVENTOR
CHARLES K. HEIZER
BY
ATTORNEY

INVENTOR
CHARLES K. HEIZER

BORING TOOL ASSEMBLY

This invention relates to metal working tools and more particularly to a numerical controlled boring tool assembly.

Conventional boring mills commonly provide for three types of movement between the working object and the cutting tool. Platforms are slidably adapted for moving the object along two horizontal axes which are perpendicular to each other. In addition, the boring tool itself is often vertically movable with respect to the platforms. The ability to adjust these horizontal and vertical axes with a continuous path numerical control system during the boring or milling operation makes possible a wide variety of flexibility in machining work objects. However, the flexibility of the boring mill can be greatly enhanced by making possible the adjustment of the axis with a continuous path numerical control system about which the cutting tool rotates while the boring operation is in progress. This invention provides a boring tool assembly which includes means for adjusting the rotational radius of the cutting tool while it is rotating. This invention also contemplates a boring tool assembly which can use a hydraulic cylinder or any numerical control drive means to adjust the rotational radius of the cutting tool, thereby allowing boring operations which can be performed to high tolerances. The provision of this fourth adjustment makes possible contour boring wherein the axis of the cutting tool may be enlarged or diminished as the cutting tool progresses through the work object. This feature is extremely valuable for such work operations as single-point threading with numerical control and boring apertures which have enlarged diameters intermediate their ends.

The ability to expand the rotational radius of the cutting tool makes possible the boring of a blind hole, the expansion of the rotational radius, and the widening of the hole to the desired radius by boring from the bottom to the top. When the hole is bored from the bottom to the top, the chips are free to fall to the bottom of the hole so that they do not interfere with the cutting surface of the cutting tool. As a result this machine is capable of producing a machine finish which is superior to those produced by conventional boring machines.

This invention also provides an advantage over boring tools presently being used by including means for continuously changing the rotational axis of the tool while it is progressing through the work object without having to stop the boring operation to make the adjustment.

Among the several objects of the invention may be noted the provision of a boring tool assembly in which the radial axis of its cutting tool can be varied continuously during the boring process; the provision of a boring tool assembly which can have its cutting diameter adjusted to high tolerances; the provision of a boring tool assembly which holds a cutting tool rigidly to prevent inaccuracies during a boring operation; the provision of a boring tool assembly which is easily adapted to be controlled by a programmed control system; the provision of a boring tool assembly which can bore a hole in a work object without any interference from chips produced by the boring operation; and the provision of a boring tool assembly which produces a machine finish which is superior to those produced by conventional boring machines. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, FIG. 1 is a perspective view of the boring tool assembly;

FIG. 2 is an enlarged sectional view taken along line 2-2 of FIG. 1;

Corresponding reference characters indicate corresponding parts throughout the several views of the drawings.

Figure 1:
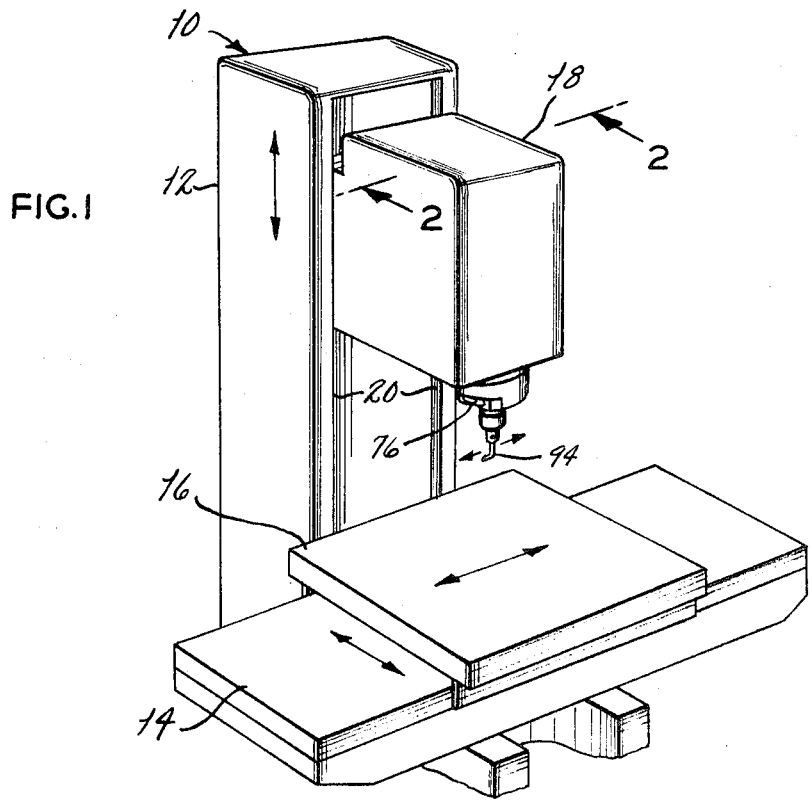
Figure 3:
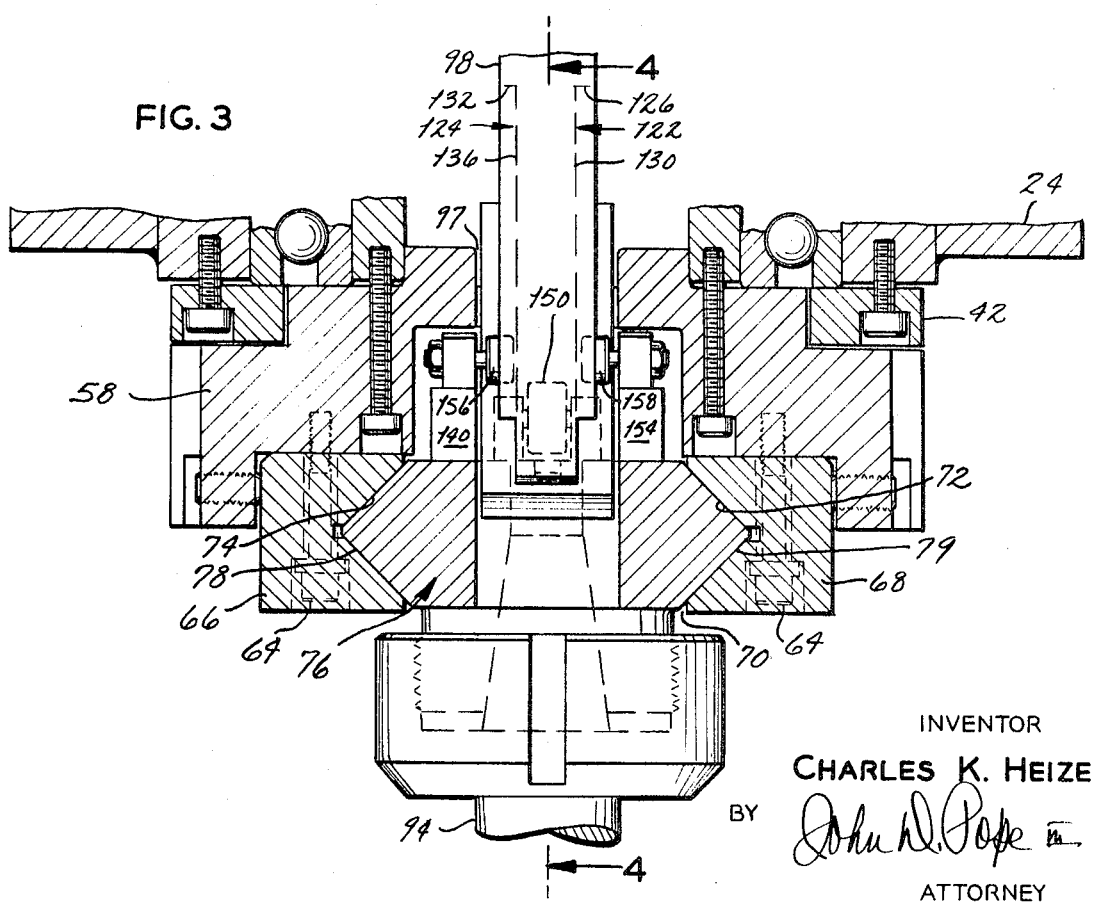
FIG. 3 is an enlarged sectional view taken along line 3-3 of FIG. 2.

Referring now to the drawings, numeral 10 designates a conventional drilling tool support having a vertically disposed frame member 12 with two sliding platforms 14, 16, horizontally disposed at its base. Platforms 14, 16, are adapted to slide horizontally along axes perpendicular to each other as shown by the arrows in FIG. 1. A tool frame 18 is slidably secured to frame member 12 and is adapted to slide vertically along frame member 12 within guides 20.

Within tool frame 18 is the drilling tool assembly 22 which embodies this invention. A spindle housing 24 is operatively mounted within tool frame 18 and includes an upper aperture 26 in its top and a lower aperture 28 in its bottom. Mounted around the circumference of aperture 26 is a ball bearing housing 30 which contains a plurality of ball bearings 32. Within the lower aperture 28 are two ball bearing housings 34, 36, which contain a plurality of ball bearings 38, 40, respectively. At the lower end of spindle housing 24 is a circular ring 42 which is rigidly secured to spindle housing 24 by bolts 44.

Rotatably mounted within spindle housing 24 is an elongated cylindrical spindle 46 which bears against ball bearing housings 30, 34, 36. The bearing arrangement of spindle 46 to these bearing housings allows it to rotate within spindle housing 24 about a vertical axis. Spindle 46 has an upper shoulder 47 bearing against the bottom of bearing housing 30 to limit the upward movement of spindle 46. A lower shoulder 48 abuts against the upper edge of bearing housing 34 to limit the downward movement of spindle 46. At the upper end 49 of spindle 46 is secured a pulley 50 which is connected by belt 52 to drive means 54. Drive means 54 is a conventional electric or hydraulic motor which may be activated to rotate pulley 50 and spindle 46 within spindle housing 24. The lower end 56 of spindle 46 has a spindle head 58 bolted thereto by bolts 60. Spindle head 58 has a flange 62 projecting radially outwardly therefrom and bearing against the bottom surface of ring 42 to prevent upward longitudinal movement of head 58 and spindle 46 with respect to spindle housing 24. Secured to the bottom of head 58 by bolts 64 are two guide track members 66, 68, which are parallel and spaced apart to form a guide track 70. The inner sides 72, 74, of guide track members 66, 68, face one another and have grooves running longitudinally therein which appear V-shaped in cross section. The longitudinal axes of guide track members 66, 68, and guide track 70 extend perpendicularly to the rotational axis of spindle 46. In the drawings the rotational axis of spindle 46 is illustrated as being vertical and the longitudinal axis of guide track 70 is illustrated as being horizontal. It is preferred that guide track 70 be positioned with its longitudinal axis running through and perpendicular to the rotational axis of spindle 46.

Figure 5:
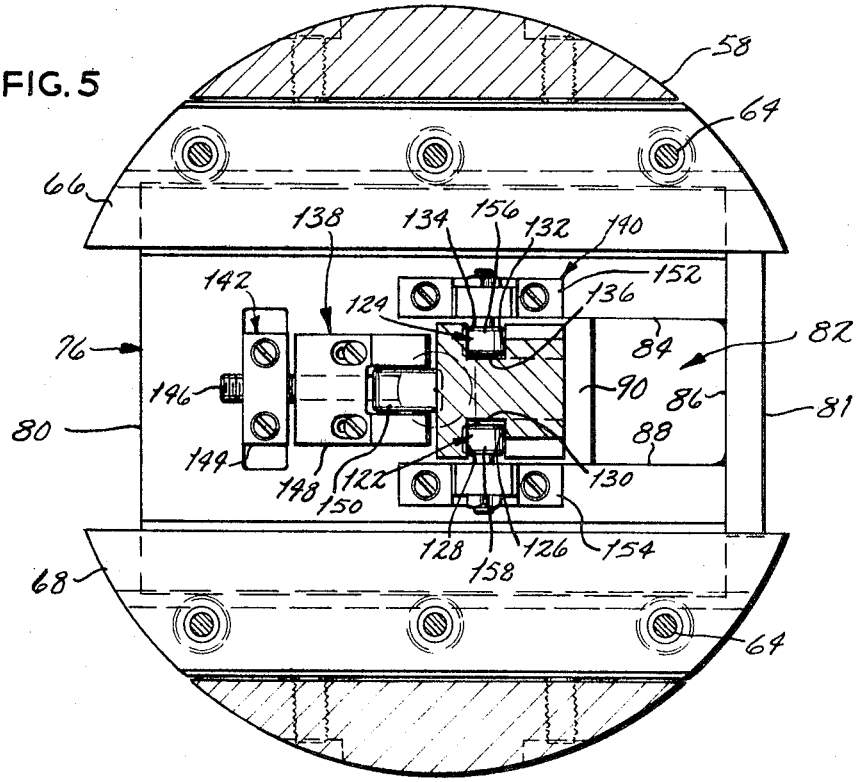
FIG. 5 is a sectional view taken along line 5-5 of FIG. 4.
Figure 4:
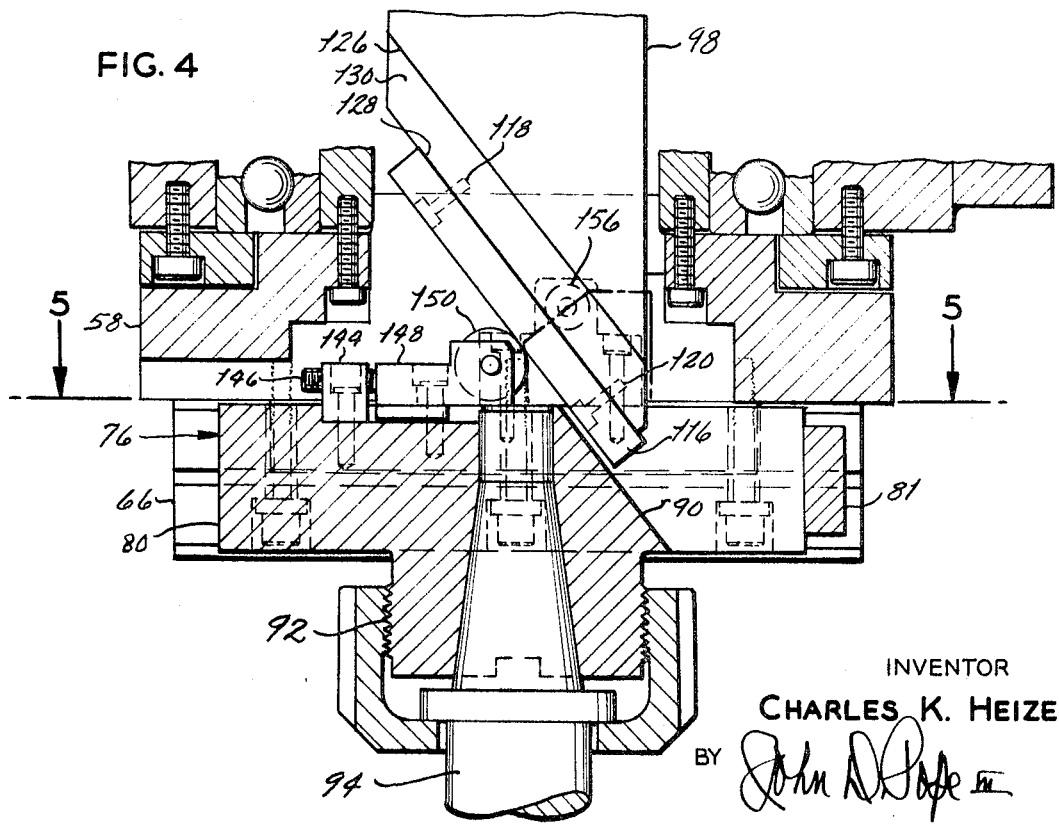
FIG. 4 is a sectional view taken along line 4-4 of FIG. 3.

A block member 76 is slidably inserted within guide track 70 with its lateral slides 78, 79, being V-shaped in cross section and being matingly inserted within the V-shaped portions of guide track members 66, 68. Block member 76 also has opposite ends 80, 81 (FIG. 5). Adjacent end 81 of block member 76 is a vertically disposed opening 82 having three vertical sides 84, 86, 88, and a slanted side 90. Slanted side 90 faces toward end 81 and is slanted from its bottom edge upwardly and away from end 81. Extending downwardly from the bottom of block member 76 is a threaded portion 92. Threadedly mounted upon threaded portion 92 is a conventional cutting tool 94. Spindle 46, guide track members 66, 68, block member 76, and tool 94 all engage each other so that activation of drive means 54 causes them to rotate as a unit about a vertical axis with block member 76 serving as a cutting tool support member for cutting tool 94.

Spindle 46 has a longitudinal channel 96 extending vertically therethrough. Channel 96 is circular in cross section and extends through opening 97 of spindle head 58 to form communication between the upper end of spindle 46 and block member 76. An elongated shaft member 98, rectangular in cross section, is movably received within channel 96 and is adapted to move longitudinally upward and downward therein. Also within channel 96 are two oppositely positioned longitudinal blocks 99 and two oppositely positioned roller bearings 100. Shaft 98 has an upper end 102, a lower end 104, and longitudinal sides 105, 106, 107, 108. Block adjustment bolts 109 threadably extend through the walls of spindle 46 to engage blocks 99 and to force them inwardly to embrace the opposite sides 105, 107, of shaft 98. Roller bearings 100 are held in bearing engagement with the opposite sides 106, 108, of shaft 98 by adjustable bearing brackets 110 which are threadably mounted upon bearing adjustment bolts 111. Thus blocks 99 and roller bearings 100 embrace the longitudinal sides of shaft 98 to prevent its rotational movement with respect to spindle 46 and to hold it in position within channel 96 of spindle 46. Adjustment bolts 109, 111, provide means for adjusting the tightness with which blocks 99 and roller bearings 100 embrace shaft 98. Lock nuts 112 are provided on bolts 109 for maintaining them in the desired adjustment. Shaft 98 is permitted to move longitudinally within channel 96 by its bearing engagement with roller bearings 110 which are rotatable about horizontal axes. Blocks 99 are adjusted to permit shaft 98 to slide longitudinally therebetween, but they embrace the sides of shaft 98 tightly enough to prevent its rotational movement with respect to spindle 46.

At the lower end of shaft 98 is a downwardly projecting vertical flange 114 which has its longitudinal axis angling in an upward direction and in a direction parallel to the longitudinal axis of guide track 70. In cross section, flange 114 and its connection with the lower end of shaft 98 appear T-shaped. Flange 114 lies in a vertical plane which runs parallel to the longitudinal axis of guide track 70. A lower wedge plate 116 is bolted to the lower edge of flange 114 by bolts 118, 120, to form an outwardly projecting horizontal flange at the bottom of flange 114, thereby making flange 114 and its connection to the lower end of shaft 98 and wedge plate 116 appear I-shaped in cross section (FIG. 5). The securement of lower wedge plate 116 to the lower edge of flange 114 causes two shaft channels 122, 124, to be formed on opposite sides of the lower end of shaft 98. Channel 122 includes an upper channel shoulder 126 formed by the lower end of shaft 98, a bottom channel shoulder 128 formed by lower wedge plate 116 and a vertically disposed channel floor 130 formed by flange 114. Channel 124 includes an upper shoulder 132 formed by the lower edge of shaft 98, a bottom shoulder 134 formed by lower wedge plate 116 and a channel floor 136 formed by flange 114. The longitudinal axes of channels 122, 124, lie within vertical planes parallel to the longitudinal axis of guide track 70 and slant from their lower ends in an upward direction and in a direction parallel to the longitudinal axis of guide track 70.

Block member 76 has a bearing assembly 138 rigidly secured to its upper surface. Bearing assembly 138 includes an upper bearing bracket 140 and a lower bearing bracket 142. Lower bearing bracket 142 includes a bracket base 144 operatively secured to block 76 and having a lead screw 146 threadedly extending horizontally therethrough. Also threaded upon lead screw 146 is a bearing yoke 148 which has a lower roller bearing 150 rotatably mounted therein. Bearing yoke 148 holds lower roller bearing 150 in bearing engagement with the bottom slanted surface of lower wedge plate 116. Because of the threaded mounting of bearing yoke 148 on lead screw 146 it is possible to move bearing yoke 148 longitudinally along block 76 by turning lead screw 146. Upper bearing bracket 140 includes two bearing yokes 152, 154, which are rigidly secured to block member 76, and which have upper roller bearings 156, 158, rotatably mounted therein. Upper roller bearings 156, 158, are held by bearing yokes 152, 154, in channels 122, 124, respectively. Upper roller bearings 156, 158, are slightly smaller in diameter than the width of channels 122, 124, so that they can roll along upper shoulders 126, 132, and bottom shoulders 128, 134, of channels 122, 124, respectively. This structural arrangement permits upper shoulders 126, 132, to act as upper inclined bearing surfaces, and permits bottom shoulders 128, 134, to serve as lower inclined bearing surfaces for roller bearings 156, 158.

It can be seen from the above described arrangement of the upper and lower roller bearings that wedge plate 116 is embraced between lower roller bearing 150 and upper roller bearings 156, 158. By turning lead screw 146 lower roller bearing 150 is moved toward or away from upper roller bearings 156, 158, thereby increasing or decreasing respectively the tightness with which they embrace lower wedge plate 116. It is desirable to have lower wedge plate 116 embraced tightly by the roller bearings to limit the "play" between shaft 98 and block member 76.

Adjacent upper end 102 of shaft 98 is a bolt opening 170 which extends horizontally through shaft 98. A vertically disposed aperture 172 extends downwardly from upper end 102 into bolt opening 170. Numeral 174 designates a bearing cup having cylindrical bearing-cup walls 176 and a bearing-cup bottom 178. Bearing cup 174 is cylindrical and its walls 176 form a cylindrical bearing chamber 180. At the bottom end of chamber 180 is an inwardly projecting circular shoulder 182 which is formed at the junctures of bearing-cup walls 176 and bearing-cup bottom 178. Extending downwardly from the bottom of bearing cup 174 is a threaded bearing-cup stud 184. Bearing-cup stud 184 protrudes into bolt opening 170 through aperture 172 and has a washer 186 and a threaded nut 188 operatively secured to its lower end to rigidly secure bearing cup 174 to the upper end 102 of shaft 98.

Circular ball bearing housings 190, 192, each containing a plurality of ball bearings 194, 196, are fitted within bearing cup 174 and rest upon shoulder 182. A circular bearing-cup lid 198 is secured over the top of bearing cup 174 by bolts 200 and holds ball bearing housings 190, 192, within bearing chamber 180 against shoulder 182. Bearing-cup lid 198 has a circular opening 202 slightly smaller in diameter than the diameter of bearing chamber 180 forming communication between the interior and exterior of bearing chamber 180.

A piston rod 204 protrudes downwardly from a conventional hydraulic drive assembly 206. The lower end of piston rod 204 has a reduced diameter portion 208 protruding through circular opening 202 of bearing-cup lid 198 into bearing chamber 180 and rotatably bearing against bearing housing 190. Piston rod shoulder 210 at the upper end of reduced diameter portion 208 rests on bearing housing 190 to limit the downward movement of piston rod 204 into bearing chamber 180. Beneath lower bearing housing 192 is a bearing washer 212 having a bottom washer flange 214 engaging the bottom of lower ball bearing housing 192 and a cylindrical washer neck 216 extending upwardly within bearing housing 192 and rotatably bearing on ball bearing housing 192. A bolt 218 extends upwardly through bearing washer 212 and threadably engages the lower end of piston rod 204. Thus bottom washer flange 214 holds piston rod 204 against upward movement with respect to shaft 98 and piston rod shoulder 210 holds piston rod 204 against downward movement with respect to shaft 98. However, shaft 98 is permitted to rotate with respect to piston rod 204 while piston rod 204 remains stationary because of the bearing engagement of piston rod 204 and bearing washer 212 within ball bearing housings 190, 192, respectively.

The method of operation of this assembly is as follows. When drive means 54 is activated it causes belt 52 to rotate spindle 46, shaft 98, spindle head 58, block member 76, and cutting tool 94 as a unit. Shaft 98 rotates around piston rod 204 by means of ball bearings 194, 196. When hydraulic drive assembly 206 is in an inactivated state it holds piston rod 204 and shaft 98 against vertical movement. Because shaft 98 is held against vertical movement and because upper roller bearings 156, 158, and lower roller bearing 150 tightly embrace lower wedge plate 116 of shaft 98, block member 76 is held against longitudinal movement along guide track 70.

Figure 6:
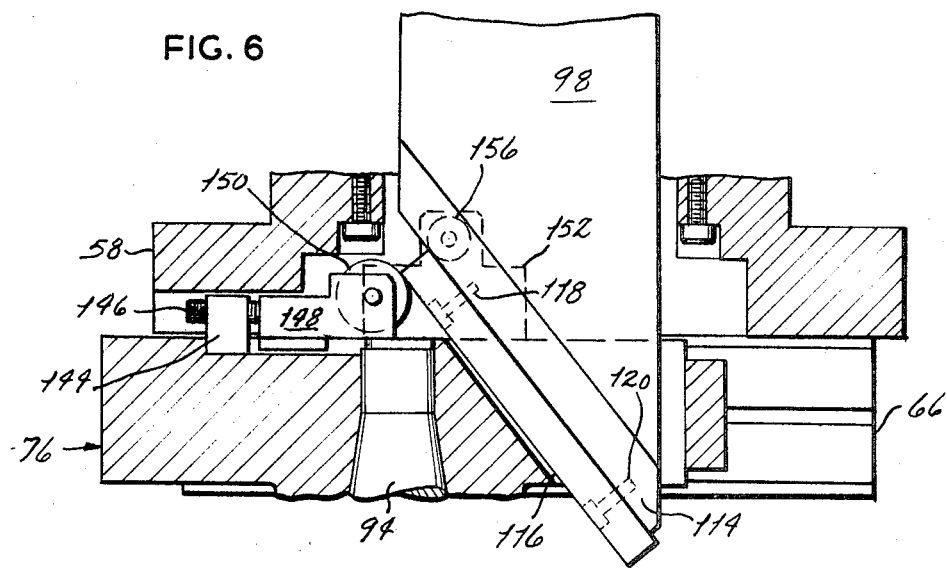
FIG. 6 is a view similar to FIG. 4 illustrating the wedge portion of the assembly in a lowered position.
Figure 7:
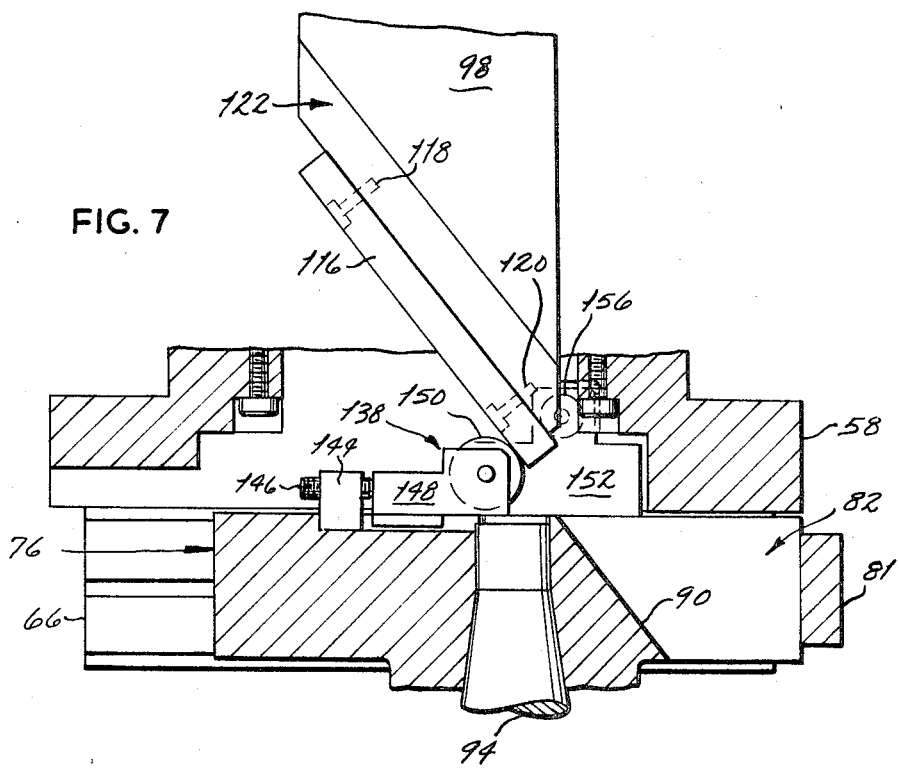
FIG. 7 is a view similar to that of FIGS. 4 and 6 illustrating the wedge portion of the assembly in an elevated position.
Figure 8:
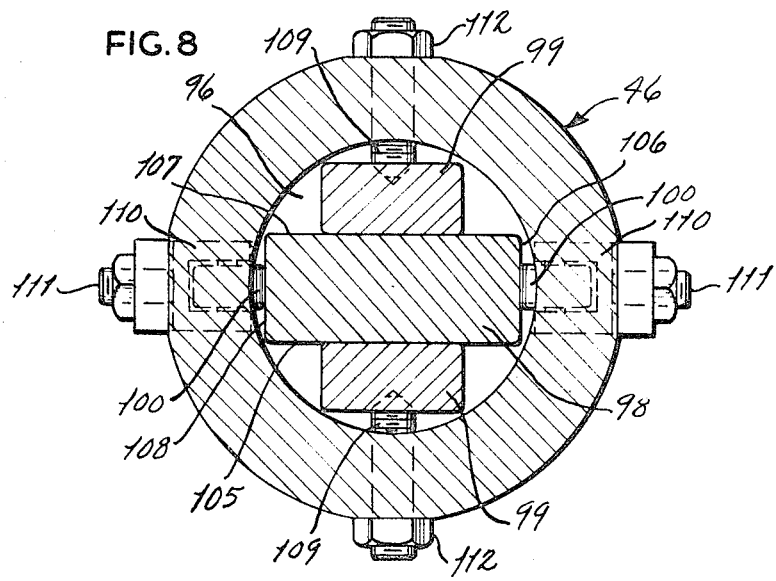
FIG. 8 is a sectional view taken along line 8-8 of FIG. 2.
Figure 9:
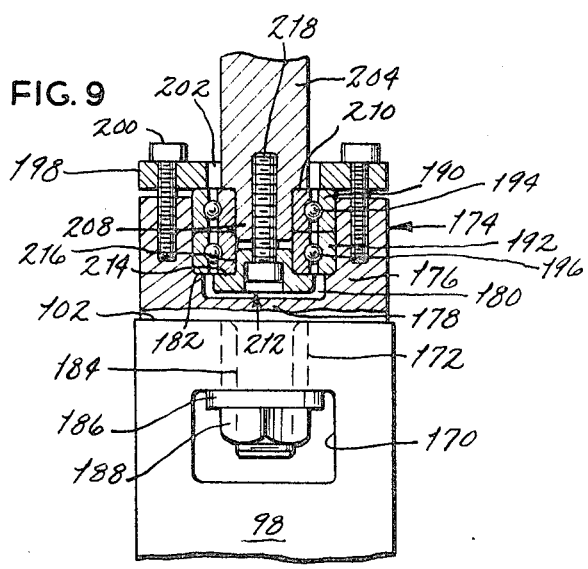
FIG. 9 is an enlarged view of the upper portion of FIG. 2.

Hydraulic drive assembly 206, piston rod 204, and shaft 98 serve as a movable tool adjustment means wherein shaft 98 acts as a movable block-engaging member. When it is desired to increase the rotational radius of cutting tool 94, hydraulic drive assembly 206 is actuated to move piston rod 204 downwardly, thereby causing shaft 98 to move downwardly within channel 96, rolling upper roller bearings 160. The downward movement of shaft 98 causes upper channel shoulders 126, 134, to exert on upper roller bearings 156, 158, a vertical force downward and a horizontal force parallel to the longitudinal axis of guide track 70. Guide track 70 resists any downward movement of block member 76 in response to the downward force exerted on it, but guide track 70 permits block member 76 to slide along the longitudinal axis of guide track 70 in response to the horizontal force exerted by upper channel shoulders 126, 134, of shaft channels 122, 124. Lower wedge plate 116 exerts similar horizontal and vertical forces on lower roller bearing 150 to facilitate the urging of block member 76 along guide track 70. The movement of block member 76 within guide track 70 causes cutting tool 94 to be moved horizontally in relationship to the rotational axis of spindle 46. FIG. 7 illustrates shaft 98 in a first elevated position with lower roller bearing 150 and upper roller bearing 158 engaging the lower end of channel 122. FIG. 6 illustrates shaft 98 in a second lowered position with roller bearings 150, 158, engaging the upper end of channel 122. FIGS. 6 and 7 also illustrate that when shaft 98 is moved from an elevated position to a lowered position, block member 76 is forced to move from right to left as viewed in the drawings. When shaft 98 is moved from a lowered position (FIG. 6) to an elevated position (FIG. 7), block member 76 moves from left to right. Thus it can be seen that raising or lowering shaft 98 moves cutting tool 94 inwardly or outwardly with respect to the rotational axis of spindle 46.

It should be noted that the bearing engagement of piston rod 204 within the upper end of shaft 98 permits shaft 98 to rotate with respect to piston rod 204 and further permits piston rod 204 to move shaft 98 vertically upwardly and downwardly within spindle 46 while spindle 46 and shaft 98 are rotating. This feature therefore permits the continuous varying of the rotational axis of cutting tool 94 while cutting tool 94 is rotating and boring through a work object.

The advantages of being able to vary the rotational axis of the cutting tool during the boring operation are many. For example a hole may be partially drilled at one diameter and then the rotational radius of the cutting tool may be increased or decreased when it is partially through the work object to enlarge or decrease the diameter of the hole intermediate its ends. It is not necessary to stop the boring process in order to change the rotational axis of the cutting tool. The rotational radius may be continuously increased and decreased during the progression of the cutting tool through the work object, thereby permitting the boring of apertures having contours which change gradually.

It is also possible to bore a hole from the bottom to the top (back boring) of the work object with this invention. A hole having a diameter smaller than that desired is bored from top to bottom. Then the rotational radius of the cutting tool is increased to the desired size and the cutting tool bores out the hole from bottom to top. The advantage of this process is that the chips fall out of or to the bottom of the hole as it is being drilled, thereby eliminating their interference with the cutting tool as it cuts the work object. Thus a smoother cutting finish results.

This invention permits the adjustment of the rotational axis of the cutting tool to very minute dimensions because of the wedge-shaped shaft 98 and because the roller bearings on block 76 tightly embrace the lower end of shaft 98. The use of a hydraulic cylinder to move the shaft 98 also adds to the ability to make fine adjustments.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A boring tool assembly comprising a support; a spindle rotatably mounted on said support; spindle drive means adapted to rotate said spindle about a rotational axis; a tool support member mounted on said spindle in such a manner that it is movable toward and away from said rotational axis of said spindle and is held against rotational movement with respect to said spindle; said tool support member being provided with means for operatively securing a tool thereto; an elongated member mounted within said spindle in such a manner that it is longitudinally movable along said rotational axis of said spindle and is held against rotational movement with respect to said spindle; and cooperating means between said tool support member and said elongated member for transferring longitudinal movement of said elongated member to said tool support member, thereby causing lateral movement of said tool support member with respect to said rotational axis of said spindle; said cooperating means including two spaced apart and parallel inclined surfaces on one of said members, one of said inclined surfaces being formed by a plate having opposite flat sides; and a first and second rotatable bearing on the other of said members, said first bearing being interposed between said two inclined surfaces, said second bearing being spaced apart from said first bearing, said second bearing and said first bearing embracing said plate therebetween and rotatably engaging said opposite flat sides.

2. A boring tool assembly comprising a support; a spindle rotatably mounted on said support; spindle drive means adapted to rotate said spindle about a rotational axis; a tool support member mounted on said spindle in such a manner that it is movable toward and away from said rotational axis of said spindle and is held against rotational movement with respect to said spindle; said tool support member being provided with means for operatively securing a tool thereto; an elongated member mounted within said spindle in such a manner that it is longitudinally movable along said rotational axis of said spindle and is held against rotational movement with respect to said spindle; and cooperating means between said tool support member and said elongated member for transferring longitudinal movement of said elongated member to said tool support member, thereby causing lateral movement of said tool support member with respect to said rotational axis of said spindle; said cooperating means including at least one inclined surface on one of said members, said inclined surface being formed by a flat plate having opposite flat surfaces; a first bearing on the other of said members, said bearing rotatably engaging said inclined surface, and a second bearing also on said other of said members, said second bearing and said first bearing being spaced apart and rotatably engaging said opposite flat surfaces of said plate.

3. A boring tool assembly according to claim 2 wherein said tool support members include means for moving said bearings toward each other to increase the tightness with which they embrace said plate.

4. A boring tool assembly according to claim 3 wherein said means for moving said bearings is a lead screw.

5. A boring tool assembly according to claim 2 wherein said plate is mounted on one end of said elongated member and said bearings are on said tool support member.

6. A boring tool assembly according to claim 2 wherein said elongated member includes a flange extending longitudinally from one of its ends so as to give said one end a T-shaped cross-sectional configuration; said plate being detachably mounted to said flange so as to give said one end an I-shaped cross-sectional configuration.